(12) United States Patent
Itakura et al.

(10) Patent No.: US 9,220,986 B2
(45) Date of Patent: Dec. 29, 2015

(54) SERVER DEVICE, METHOD FOR CONTROLLING THE SAME, COMPUTER-READABLE RECORDING MEDIUM, AND GAME SYSTEM

(71) Applicants: GREE, INC., Tokyo (JP); SQUARE ENIX CO., LTD., Tokyo (JP)

(72) Inventors: Yuichi Itakura, Tokyo (JP); Daisuke Watanabe, Tokyo (JP)

(73) Assignees: GREE, INC., Tokyo (JP); SQUARE ENIX CO., LTD., Tokyo (JP)

( * ) Notice: Subject to any disclaimer, the term of this patent is extended or adjusted under 35 U.S.C. 154(b) by 0 days.

(21) Appl. No.: 14/180,991

(22) Filed: Feb. 14, 2014

(65) Prior Publication Data
US 2014/0315644 A1  Oct. 23, 2014

(30) Foreign Application Priority Data
Feb. 15, 2013 (JP) ................................. 2013-028412

(51) Int. Cl.
| | |
|---|---|
| *A63F 13/55* | (2014.01) |
| *A63F 13/332* | (2014.01) |
| *A63F 13/35* | (2014.01) |
| *A63F 13/69* | (2014.01) |

(52) U.S. Cl.
CPC ............... *A63F 13/332* (2014.09); *A63F 13/35* (2014.09); *A63F 13/69* (2014.09)

(58) Field of Classification Search
CPC ......... A63F 13/45; A63F 13/47; A63F 13/55; A63F 13/69; A63F 2300/609
USPC ........................................................ 463/9, 42
See application file for complete search history.

(56) References Cited

U.S. PATENT DOCUMENTS

| | | | | |
|---|---|---|---|---|
| 2005/0282615 | A1* | 12/2005 | Englman et al. | 463/20 |
| 2007/0123339 | A1* | 5/2007 | Sato | 463/16 |
| 2007/0191096 | A1* | 8/2007 | Tanaka | 463/31 |
| 2010/0137047 | A1* | 6/2010 | Englman et al. | 463/6 |
| 2010/0306717 | A1* | 12/2010 | Yamada et al. | 715/863 |
| 2011/0319167 | A1 | 12/2011 | Sakurai et al. | |
| 2013/0310182 | A1 | 11/2013 | Sakurai et al. | |

FOREIGN PATENT DOCUMENTS

| | | |
|---|---|---|
| JP | 2008-239759 A | 10/2008 |
| JP | 2011-255053 A | 12/2011 |
| JP | 2013-020300 A | 1/2013 |

* cited by examiner

*Primary Examiner* — Allen Chan
(74) *Attorney, Agent, or Firm* — Drinker Biddle & Reath LLP

(57) ABSTRACT

A server device and the like providing a game and capable of enhancing the unpredictability and amusement of the game and increasing the fun and thrill of the game as a whole are realized. A server device according to the present invention is connected to a terminal device via a network and provides a game, and includes: an information storage unit for storing information related to the game; and a control unit for accessing the information, executing various operations, and displaying images of the game on the terminal device. In the game, a plurality of item boxes of a plurality of types, each of which is assigned a predetermined reward item, are displayed on the terminal device.

12 Claims, 4 Drawing Sheets

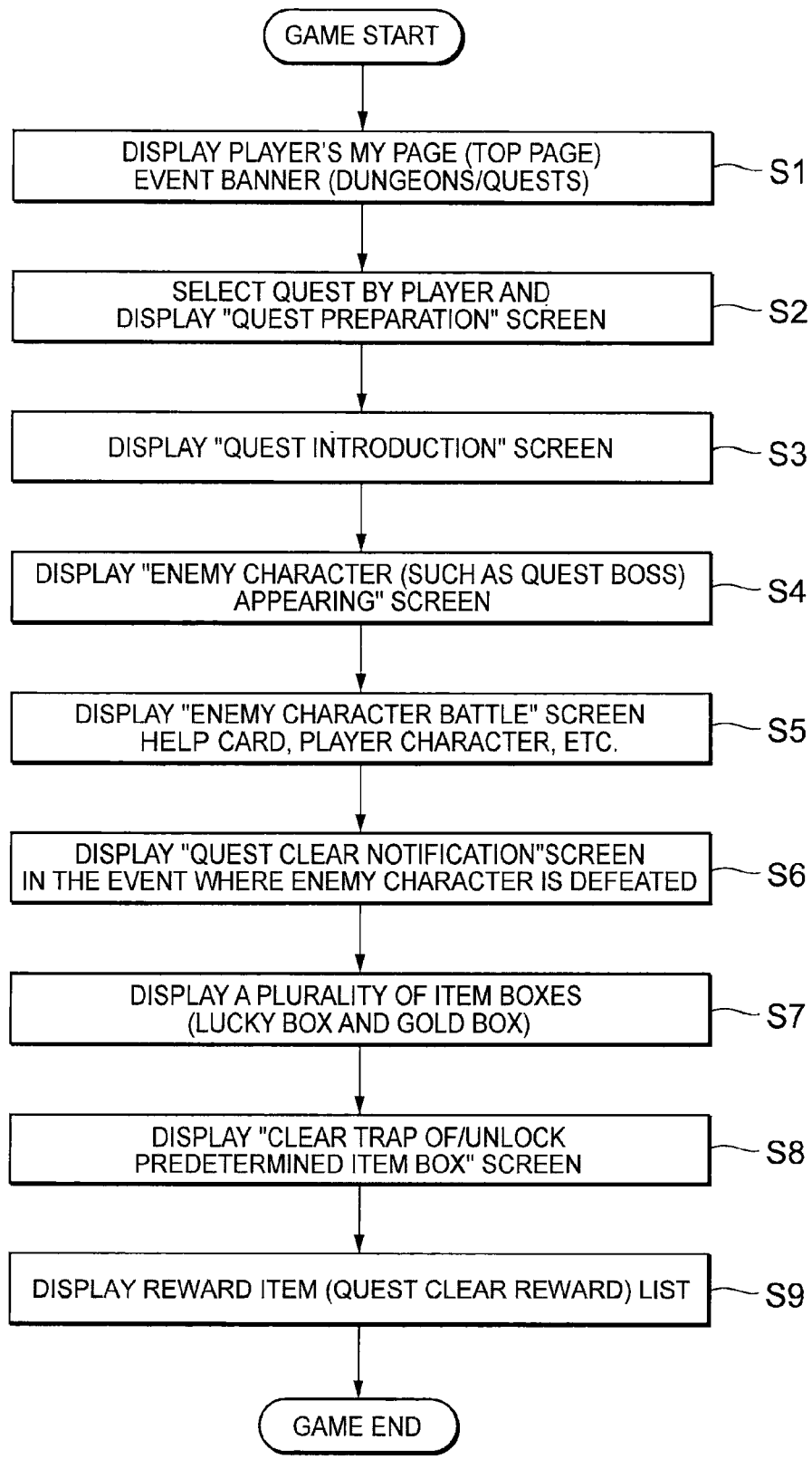

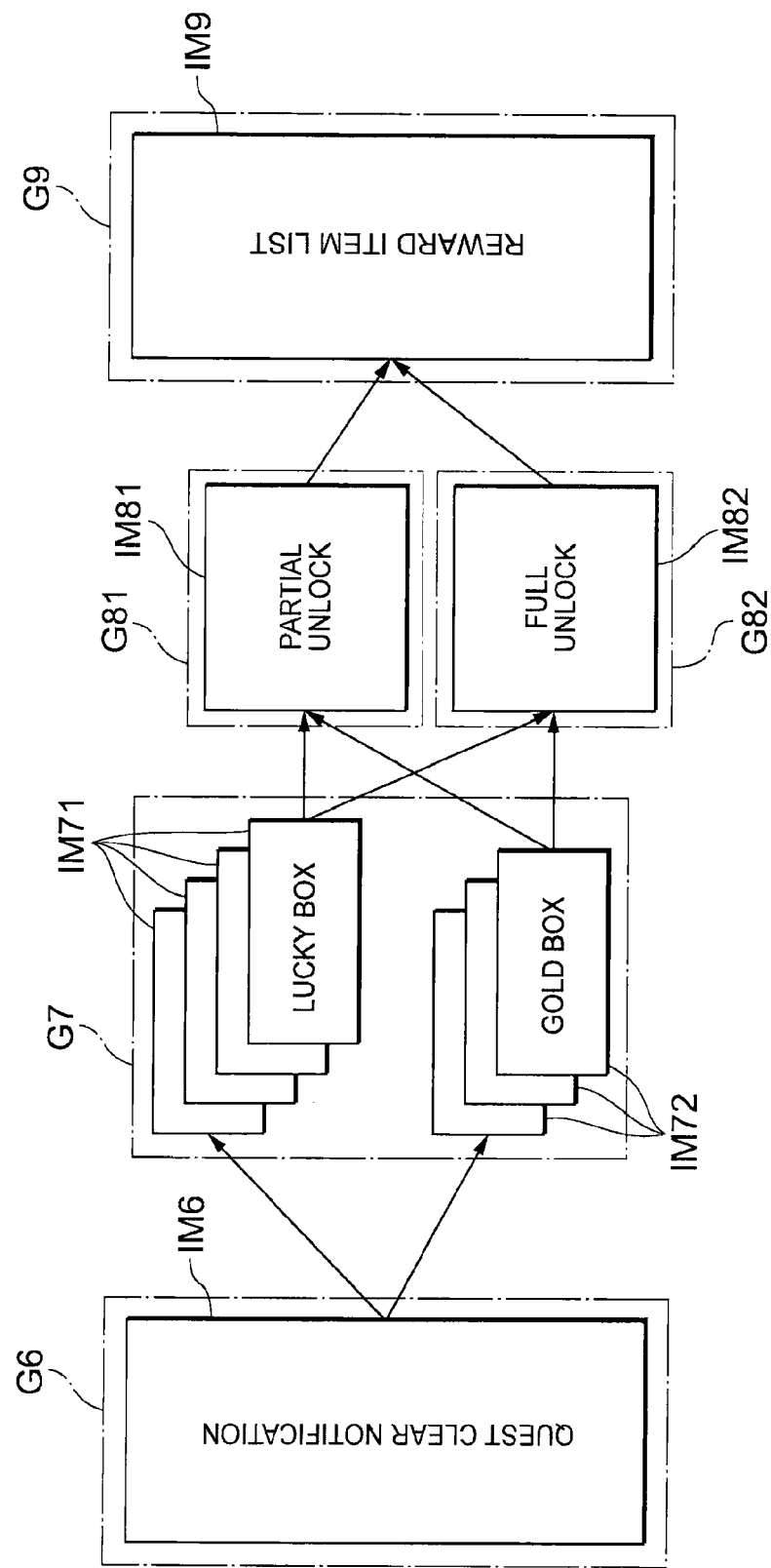

SERVER DEVICE, METHOD FOR CONTROLLING THE SAME, COMPUTER-READABLE RECORDING MEDIUM, AND GAME SYSTEM

BACKGROUND OF THE INVENTION

1. Field of the Invention

The present invention relates to a server device, a method for controlling a server device, a computer-readable recording medium, and a game system.

2. Background Art

In a computer game such as a role-playing game or an action game executed in an information processing device such as a computer, an appropriate reward or compensation is provided according to a game operation by a player (client). Though the provision of such a reward or compensation itself can be an incentive when the player plays the computer game, various games with further elaborate performance and amusement in reward or compensation provision have also been proposed.

For example, Patent Document 1 describes an example of a role-playing game in which, in the event where a player character finds a treasure chest (box) placed in a virtual game space (e.g. a dungeon which has been set) and acquires various items contained in the treasure chest, subsequent development turns in the player character's favor. In this game, the treasure chest can be opened by the player character defeating an enemy character (e.g. a monster) appearing in a specific situation or a specific location.

Patent Document 2 describes an example of a shooting game in which a player progresses through each of a plurality of game stages while finding a treasure chest placed in a game field and creating a new weapon through fusing or the like using weapons contained in the treasure chest or other items. In this game, the position of the treasure chest is presented on a predetermined game map, based on which the player can reach the place where the treasure chest is present.

Patent Document 3 describes an example of a game in which an enemy character and a treasure chest simultaneously appear on a game screen, a player character checks the treasure chest to further display an image of a game item contained in the treasure chest, and, for example in the case where the player performs a predetermined operation at a speed higher than a reference speed, the game item can be acquired and added to the player character's possessions.

CITATION LIST

Patent Document(s)

[Patent Document 1] JP2008-289759 A
[Patent Document 2] JP2011-255053 A
[Patent Document 3] JP2013-020300 A

SUMMARY OF THE INVENTION

Thus, in the above-mentioned conventional games, the player is given chances of acquiring various game items and, as performance for this, a game scenario is employed in which a "treasure chest" capable of containing a game item is displayed on the game screen. The treasure chest is unlocked (opened) and the contained game item appears when the operation by the player satisfies the game item acquisition condition (such as defeating the enemy character).

In the conventional games, however, the treasure chest that appears for example when the enemy character is defeated or that can be found while exploring the game space is single. Further, the basic setting is unchanged even in different game stages or game scenes. In such respect, the conventional games are still uniform, and lack sufficient unpredictability, performance, and amusement. This could diminish the player's willingness to participate in or continue the game, or reduce the fun and thrill of the game as a whole.

The present invention has been made in view of such circumstances, and has an object of providing a server device, a method for controlling the server device, a program, and a game system for providing a game that can add or enhance unpredictability, performance, and amusement in a game scene or a game progress status when a game item such as a reward item is provided to a player as a reward, thus encouraging the player's willingness to participate in or continue the game and enhancing or increasing the fun and thrill of the game as a whole.

To solve the problem stated above, a server device according to the present invention is a server device that is connected, via a communication line, to a terminal device operated by a player, and provides a game including a predetermined event, the server device including: an information storage unit for storing information related to the game; and a control unit for accessing the information, executing an operation related to the game, and displaying an image of the game on the terminal device.

The information storage unit stores, as a part of the information related to the game, information of a determination condition (criterion) associated with the predetermined event, a plurality of reward items of a plurality of types (which may be expressed as gift items, reward items, etc.), and a plurality of item boxes of a plurality of types. The control unit assigns at least one of the reward items to each of the item boxes, determines whether or not an operation by the player in the game satisfies the determination condition, displays the plurality of item boxes of the plurality of types on the terminal device at one time (in other words, displays all of the plurality of item boxes of the plurality of types simultaneously) based on a result of the determination, and displays, according to an operation by the player on the item boxes, a screen for providing the player with a reward item assigned to (contained in) a part or all of the item boxes, on the terminal device. For example, the reward item acquired (earned or obtained) by the player can be stored in the information storage unit in association with identification information of a player character, as with other game items.

By connecting the terminal device to the server device having such a structure via the communication line, the player can play the game including the predetermined event online or offline. The game progresses according to its settings, while the control unit in the server device accesses the game-related information stored in the information storage unit, executes various operations related to the game using the information, and displays game images as the operation results on the terminal device as game screens.

In the game, the control unit assigns at least one reward item of the plurality of reward items of the plurality of types to each of the plurality of item boxes of the plurality of types, and determines whether or not the operation by the player in the game satisfies the determination condition associated with the predetermined event. Based on the determination result (such as when the operation by the player satisfies the determination condition, e.g. in the event of defeating an enemy character), the control unit displays the plurality of item boxes of the plurality of types on the terminal device at one time. This delivers performance with exaltation that is filled with unpredictability and encourages the player's sense of anticipation, as compared with the conventional single and uniform "treasure chest" presentation. The control unit also displays, according to the operation by the player on the item boxes, the screen for providing the player with the reward item(s) assigned to (associated with) a part or all of the item boxes, on the terminal device. This keeps the player from easily guessing the reward items merely from the presentation of the item boxes. A reward item acquisition (earning) scene richer in variety can thus be created.

Before or when providing the reward item to the player, the control unit may: display, on the terminal device, a screen for enabling the player to select whether or not the player uses or possesses a specific tool necessary for acquiring reward items assigned to all of the item boxes; and receive whether or not the player uses or possesses the specific tool as the operation by the player on the item boxes.

Thus, the player is given a chance of acquiring all reward items assigned to all item boxes (namely, "take all"). This sufficiently gratifies the player's desire for reward item acquisition, and enhances his or her willingness to do so.

In this case, the control unit may determine whether or not the player uses or possesses the specific tool and, in the case where the player uses or possesses the specific tool, provide the reward items assigned to all of the item boxes to the player. Note that the present invention is not limited to the execution of such procedure or control, even in the case where the player uses or possesses the specific tool.

The control unit may determine whether or not the player uses or possesses the specific tool and, in the case where the player does not use or possess the specific tool, for example provide a reward item assigned to a part of the item boxes to the player.

Before or when providing the reward item to the player, the control unit may determine the types and the number of item boxes displayed on the terminal device at one time, randomly (arbitrarily) or based on a predetermined condition. An example of the method for determining the types and the number of item boxes is a lottery method based on an expected value (probability value) preset for each type and/or number of appearing item boxes. The term "randomly" includes the case where the determination is made by the control unit each time and/or the determination or setting is made according to a preset fixed condition (which may or may not be included in the above-mentioned "predetermined condition") (hereafter the same).

Before or when providing the reward item to the player, the control unit may determine the reward item assigned to each of the item boxes, randomly (arbitrarily) or based on a predetermined condition. Examples of the assigned reward item determination method include an optional assignment method and a lottery method based on an expected value (probability value) preset for each individual reward item included in each reward item group, where a plurality of reward item groups are set for the respective item box types beforehand.

Before or when providing the reward item to the player, the control unit may determine a probability of providing the reward item assigned to the part of the item boxes to the player, randomly (arbitrarily) or based on a predetermined condition. That is, the number of item boxes unlocked in the case where the player does not use or possess the above-mentioned "specific tool" may be changed as needed, without being fixed.

Specifically, the "predetermined condition" in each of the above-mentioned processes by the control unit may be at least one of: a progress status of the game by the player; a state (property) of a game character (player character) corresponding to the player; a type of the predetermined event; and an item box type.

In more detail, the item boxes may include a first item box and a second item box that differ in a form of being displayed on the terminal device, rarity may be set for each of the reward items, a reward item assigned to the second item box may be higher in rarity than a reward item assigned to the first item box, and the number of second item boxes displayed on the terminal device may be smaller than the number of first item boxes displayed on the terminal device simultaneously with the second item boxes.

A control method for a server device according to the present invention is a method for effectively controlling the above-mentioned server device according to the present invention, i.e. a control method for a server device that is connected, via a communication line, to a terminal device operated by a player and provides a game including a predetermined event, the server device including: an information storage unit for storing information related to the game; and a control unit for accessing the information, executing an operation related to the game, and displaying an image of the game on the terminal device.

In this method, first the information storage unit stores, as a part of the information related to the game, information of a determination condition associated with the predetermined event, a plurality of reward items of a plurality of types, and a plurality of item boxes of a plurality of types. Then the control unit assigns at least one of the reward items to each of the item boxes, determines whether or not an operation by the player in the game satisfies the determination condition, displays the plurality of item boxes of the plurality of types on the terminal device at one time based on a result of the determination, and displays, according to an operation by the player on the item boxes, a screen for providing the player with a reward item assigned to a part or all of the item boxes, on the terminal device.

A program according to the present invention causes a computer to execute the following steps, where the computer is connected, via a communication line, to a terminal device operated by a player, provides a game including a predetermined event, and is capable of accessing an information storage unit for storing, as a part of information related to the game, information of a determination condition associated with the predetermined event, a plurality of reward items of a plurality of types, and a plurality of item boxes of a plurality of types.

The steps include: a step of accessing the information, executing an operation related to the game, and displaying an image of the game on the terminal device; a step of assigning at least one of the reward items to each of the item boxes; a step of determining whether or not an operation by the player in the game satisfies the determination condition; a step of displaying the plurality of item boxes of the plurality of types on the terminal device at one time, based on a result of the determination; and a step of displaying, according to an operation by the player on the item boxes, a screen for providing the player with a reward item assigned to a part or all of the item boxes, on the terminal device.

A game system according to the present invention is a system including: the aforementioned terminal device operated by a player; and a server device that is connected, via a communication line, to the terminal device and provides a game including a predetermined event, the game system including: an information storage unit for storing information related to the game; and a control unit for accessing the information, executing an operation related to the game, and displaying an image of the game on the terminal device.

As in the server device according to the present invention, the information storage unit stores, as a part of the information related to the game, information of a determination condition associated with the predetermined event, a plurality of reward items of a plurality of types, and a plurality of item boxes of a plurality of types, and the control unit assigns at least one of the reward items to each of the item boxes, determines whether or not an operation by the player in the game satisfies the determination condition, displays the plurality of item boxes of the plurality of types on the terminal device at one time based on a result of the determination, and displays, according to an operation by the player on the item boxes, a screen for providing the player with a reward item assigned to a part or all of the item boxes, on the terminal device.

According to the present invention, when the operation by the player in the game satisfies the predetermined determination condition, the plurality of item boxes of the plurality of types associated with the reward items are displayed at one time on the terminal device operated by the player, so that splendid performance filled with unpredictability and encouraging the player's sense of anticipation is delivered as compared with the conventional single and uniform presentation technique. In addition, according to the operation by the player on the item boxes, the reward item(s) assigned to a part or all of the item boxes is provided to the player. A reward item acquisition (earning) scene richer in variety can thus be created. It is therefore possible to add or enhance unprecedented unpredictability, performance, and amusement in a game scene or a game progress status when a reward item is provided to the player, thus encouraging the player's willingness to participate in or continue the game and enhancing or increasing the fun and thrill of the game as a whole.

BRIEF DESCRIPTION OF THE DRAWINGS

FIG. 3 is a flowchart showing a part of a game procedure executed in the server device shown in FIGS. 1 and 2.

FIG. 4 is a flowchart/diagram showing an example of game screens and flow thereof in the part of the game procedure shown in FIG. 3.

DESCRIPTION OF THE PREFERRED EMBODIMENTS

Figure 1:
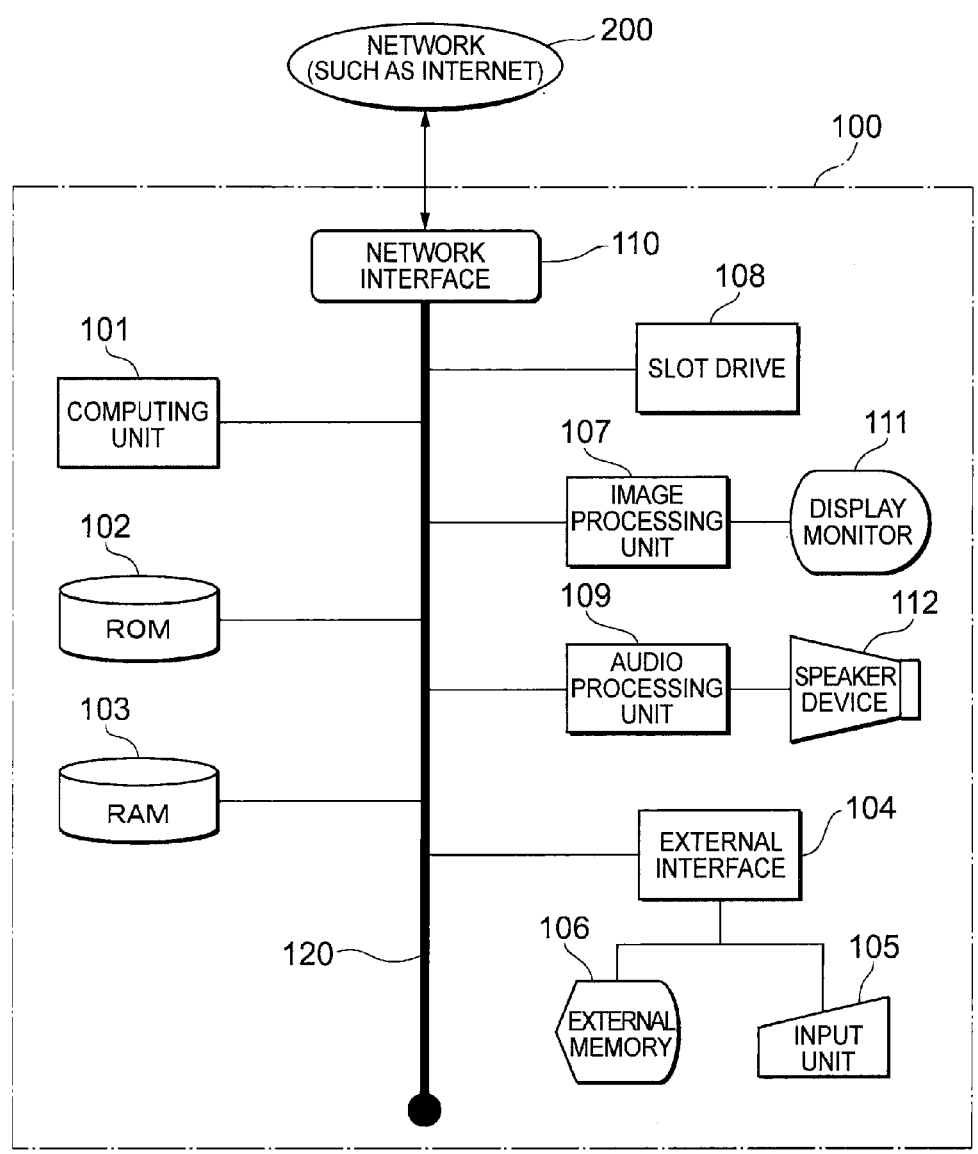
FIG. 1 is a schematic diagram (system block diagram) showing a preferred embodiment of a server device according to the present invention.

The following describes an embodiment of the present invention in detail. The following embodiment is merely illustrative of the present invention, and the present invention should not be limited to the embodiment. Various modifications are possible in the present invention, without departing from the scope of the present invention. Moreover, a person skilled in the art can adopt any embodiment in which one or more elements described below are replaced with their equivalents, and such an embodiment is also included within the scope of the present invention. The positional relationships such as up, down, left, and right shown according to need are based on the positional relationships shown in the drawings, unless stated otherwise. The dimensional ratios in the drawings are not limited to the ratios shown in the drawings. Though the following describes, as an example, an embodiment in which the present invention is implemented using an information processing device for a game to facilitate understanding, this is not a limit for the present invention as noted above.

Figure 2:
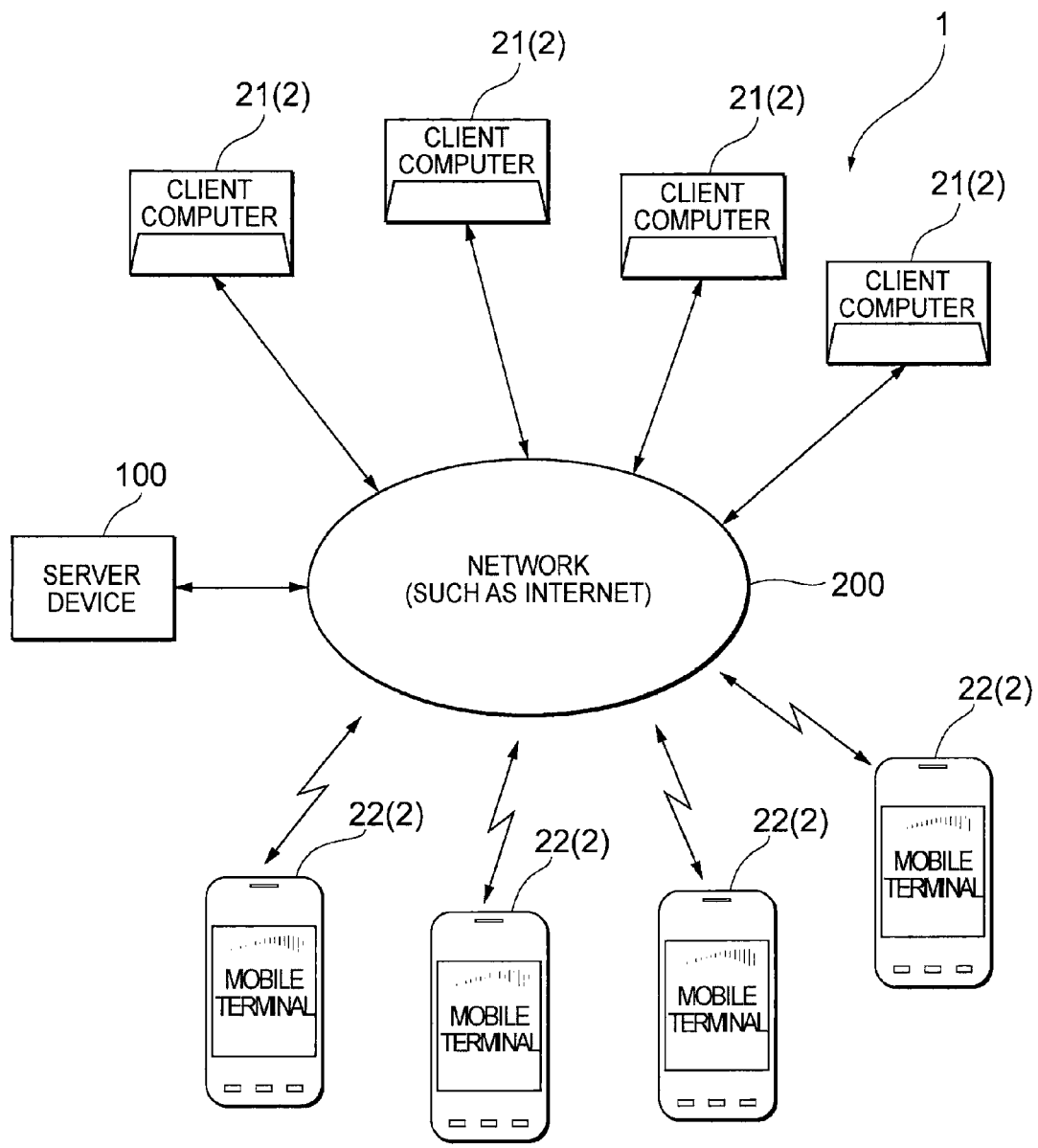
FIG. 2 is a schematic diagram (system diagram) showing a preferred embodiment of a game system according to the present invention.

FIG. 1 is a schematic diagram (system block diagram) showing a preferred embodiment of a server device according to the present invention. FIG. 2 is a schematic diagram (system diagram) showing a preferred embodiment of a game system according to the present invention. As shown in these drawings, a server device 100 is a server computer connected to a network 200 which is a communication line or a communication network for information processing such as the Internet, and achieves a server function by a predetermined server program running in the server computer. Each terminal device 2 such as a client computer 21 or a mobile terminal 22 is wiredly and/or wirelessly connected to the network 200, as with the server device 100. The server device 100 and the terminal device 2 are set to be capable of communicating with each other, thus constituting a game system 1.

In the server device 100, a computing unit 101 such as a CPU or an MPU, a ROM 102 and a RAM 103 as storage devices, an external interface 104 connected with an input unit 105 and an external memory 106, an image processing unit 107 connected with a display monitor 111, a slot drive 108 containing or connected with a disk, a memory device, and the like, an audio processing unit 109 connected with a speaker device 112, and a network interface 110 are connected to each other via a transmission path 120 such as a system bus including an internal bus, an external bus, and an expansion bus for example. Note that devices used for input/output such as the input unit 105, the external memory 106, the display monitor 111, and the speaker device 112 may be omitted according to need and, even in the case of being included, may not be constantly connected to the transmission path 120.

The computing unit 101 controls the overall operation of the server device 100, transmits and receives control signals and information signals (data) with the other components mentioned above, and also performs various operations necessary for game execution. The computing unit 101 is accordingly capable of performing, through the use of an arithmetic logic unit and the like, arithmetic operations (calculations) such as addition, subtraction, multiplication, and division, logical operations such as logical addition, logical multiplication, and logical negation, bit operations such as bit addition, bit multiplication, bit inversion, bit shift, and bit rotation, and the like, on a fast-accessible storage area such as a register. The computing unit 101 is further capable of performing saturate operations, trigonometric function operations, vector operations, and the like, according to need.

The ROM 102 stores an IPL (Initial Program Loader), which is typically executed immediately after power-on. By executing the IPL, the computing unit 101 reads, into the RAM 103, a server program or a game program recorded in the disk or the memory device contained in or connected to the slot drive 108, and executes the program. The ROM 102 also stores programs and various data for an operating system necessary for controlling the overall operation of the server device 100.

The RAM 103 is for temporary storage of the server program, the game program, and various data, and retains the read server program and game program as well as other data necessary for game progress and communication between a plurality of terminal devices 2, as mentioned above. The computing unit 101 sets a variable area in the RAM 103. The computing unit 101 executes processes such as performing an operation directly on the value stored in the variable area using the arithmetic logic unit, copying or moving the value stored in the RAM 103 to a register and performing an operation directly on the register, and writing the operation result back to the RAM 103.

The input unit 105, connected via the external interface 104, receives various operation inputs by the user (game provider) of the server device 100. The input unit 105 may be any of a keyboard, a touchpad, a touch panel, a voice input device, and the like, and the device type is not particularly limited so long as various operation inputs and instruction inputs for a decision operation, a cancel operation, a menu display, and the like are possible.

The RAM 103 or the external memory 106 which is removably connected via the external interface 104 stores data indicating the operation status of the server device 100, the access status of each terminal device 2, and the play status and progress state (past results, etc.) of the game in each terminal device 2, data of communication logs (records) between the terminal devices 2, and so on, in a rewritable form.

The image processing unit 107, after various data read from the slot drive 108 is processed by the computing unit 101 or the image processing unit 107, stores the processed image information in a frame memory or the like. The image information stored in the frame memory is converted to a video signal at a predetermined synchronization timing, and output to the display monitor 111 connected with the image processing unit 107. This enables various image displays. Image information related to the game is transmitted from the image processing unit 107 and/or the computing unit 101 to each terminal device 2, for example in cooperation with the computing unit 101.

The audio processing unit 109 converts various data read from the slot drive 108 to an audio signal, and outputs it from the speaker device 112 connected with the audio processing unit 109. Audio information (sound effects, music information) related to the game is transmitted from the audio processing unit 109 and/or the computing unit 101 to each terminal device 2, for example in cooperation with the computing unit 101.

The network interface 110 connects the server device 100 to the network 200. For example, the network interface 110 is composed of a device conforming to a standard used for constructing a LAN, an analog modem, an ISDN modem, an ADSL modem, a cable modem for connecting to the Internet or the like using a cable television line, or the like; and an interface for connecting such modem to the computing unit 101 via the transmission path 120.

A preferred embodiment of the game executed by the game program according to the present invention in the game system 1 and the server device 100 having the above-mentioned structures is described below. FIG. 3 is a flowchart showing a part of a game procedure executed in the server device 100, and especially shows flow concerning development of game screens displayed on the terminal device 2 operated by the player. FIG. 4 is a flowchart/diagram showing an example of game screens and flow thereof in the part of the game procedure shown in FIG. 3.

Various processes (display of images and screens, determination, operations, etc.) in the following procedure are executed based on control commands by the computing unit 101 in the server device 100. That is, the computing unit 101 functions as "control unit" in the present invention. The above-mentioned ROM 102, RAM 103, external memory 106, and various storage media storing game-related information correspond to "information storage unit" in the present invention.

First, the player operates the terminal device 2 (the client computer 21 or the mobile terminal 22, e.g. a tablet terminal or a smartphone), to connect the terminal device 2 to the server device 100 via the network 200 such as the Internet. The player also operates the terminal device 2 to select the game provided from the server device 100 or, in a platform screen before selecting the game, input login information such as an ID number and a password. Having recognized the login information, the computing unit 101 in the server device 100 displays the player's unique My Page associated with the ID number on the terminal device 2 (step S1). In the example of this game, a banner listing a plurality of dungeons and/or a plurality of quests set as game scenes is displayed in the My Page screen. The dungeons and the quests may be mutually or individually hierarchized.

When the player selects, for example, a desired quest from the list of the plurality of dungeons and/or the plurality of quests displayed on the terminal device 2, a "quest preparation" screen of the quest is displayed on the terminal device 2 (step S2). After the computing unit 101 completes the preparation of the selected quest, a "quest introduction" screen of the quest is displayed on the terminal device 2 (step S3). The quest may be displayed as a still image or a moving image, and may be displayed using a flash and the like.

After the introduction of the quest ends, an "enemy character appearing" screen in which an enemy character associated with the quest appears is displayed on the terminal device 2 (step S4). This game is set so that the player or a player character performs a battle (a predetermined event) against the enemy character and, in the event where the player or the player character wins the battle, the player can acquire a reward. Accordingly, after the enemy character is displayed, the player battles against the enemy character in the game, for example using various items (e.g. help card) for achieving various effects such as attacking the enemy character and defending against the attack by the enemy character, or using a player character such as an ally monster that faces and attacks the enemy character (e.g. a monster). A game screen (an "enemy character battle" screen) of the state of the battle is displayed on the terminal device 2 (step S5).

In the internal structure of the quest, the battle against the enemy character may be hierarchized or staged. An example of this setting is that, in the same quest, first weak characters appear as enemy characters and, after the player defeats the weak characters, a boss character stronger (also referred to as "harder" or "tougher") than the weak characters appears, where the player can acquire the reward only when defeating the boss character. In this case, steps S4 and S5 are repeated as a routine in the flow of the procedure shown in FIG. 3.

Next, the computing unit 101 determines whether or not the player or the player character defeats the enemy character (e.g. the boss character appearing last) (a determination condition associated with the predetermined event). The determination method is not particularly limited. For example, parameter value comparison may be used in such a manner that the player or the player character is determined as defeating the enemy character in the case where the parameter value corresponding to the physical strength (e.g. hit points or life) of the enemy character reaches less than a predetermined threshold or 0 as a result of the attack by the player or the player character. In the event where the player or the player character defeats the enemy character and clears the quest, a quest clear notification IM6 is displayed on the terminal device 2 as a game screen G6 (step S6, also see FIG. 4 (hereafter the same)).

Having cleared the quest, the player is given a reward as mentioned above. Here, instead of providing such a reward immediately and simply to the player, a game screen G7 in which a predetermined number of item boxes of each of two types (lucky box IM71 and gold box IM72) containing various reward items as rewards are juxtaposed is displayed on the terminal device 2 (step S7). Thus, a plurality of item boxes of a plurality of types are displayed in the game screen G7 at one time. In other words, a plurality of item boxes of a plurality of types are all displayed simultaneously or at the same timing in the progress of the game, in the game screen G7.

Each lucky box IM71 (first item box) and each gold box IM72 (second item box) are displayed on the terminal device 2 in different forms. For example, each gold box IM72 is displayed so as to shine entirely in gold color, whereas each lucky box IM71 is displayed as an ordinary wooden box or a box painted in a color other than gold. Each of the lucky boxes IM71 and the gold boxes IM72 is assigned a reward item (a player character card, an item usable in the game, etc.) as a reward.

The reward items assigned to the lucky boxes IM71 and the reward items assigned to the gold boxes IM72 may be set as different reward item groups. In this embodiment, the lucky boxes IM71 are regarded as normal item boxes, and the gold boxes IM72 are regarded as item boxes higher in rarity value. In detail, the respective reward item groups are set so that the reward items assigned to the gold boxes IM72 are higher in rarity than the reward items assigned to the lucky boxes IM71, and also setting or lottery is performed so that the number of gold boxes IM72 is smaller than the number of lucky boxes IM71 in the game screen G7 displayed on the terminal device 2. Though this embodiment describes the case where the reward item assigned to each item box is set based on the rarity of the reward item, the present invention is not limited to this. For example, the reward item assigned to each item box may be set based on a predetermined parameter of the reward item, the number of reward items, or the like.

Furthermore, the computing unit 101 in the server device 100 determines the number of appearing lucky boxes IM71 and the number of appearing gold boxes IM72 based on, as a predetermined condition, for example at least one of: the progress status (e.g. the number of dungeons or quests cleared) of the game by the player; the state (e.g. physical strength, experience points, the number of possessed items) of the game character corresponding to the player; the type (e.g. the level of the selected dungeon and/or quest, frequency) of the predetermined event; and the item box type (whether the item box is a lucky box IM71 or a gold box IM72). An example of the winning rate (appearance probability) of the total number of item boxes (lucky boxes IM71 and gold boxes IM72) in this case is shown below. Here, the winning rate may be a variable parameter (variable value), instead of a fixed parameter (fixed value). For instance, the expected value of the average number of appearances is about 4.6 in the example below. This expected value may be varied, with the combination of the winning rate of each number being appropriately calculated so as to achieve the expected value.

| Number | Winning rate |
|---|---|
| 3 | 30% |
| 4 | 25% |
| 5 | 20% |
| 6 | 10% |
| 7 | 10% |
| 8 | 5% |

The computing unit 101 in the server device 100 also determines the allocation ratio of lucky boxes IM71 and gold boxes IM72 to the total number of item boxes. In the case where the rarity value of each gold box IM72 is higher than the rarity value of each lucky box IM71 as in this embodiment, it is preferable to execute lottery so that the number of appearing gold boxes IM72 is smaller than the number of appearing lucky boxes IM71. As an example, the winning rate (appearance probability) can be set so that the number of appearing gold boxes IM72 is greater than or equal to 1 and less than half the total number of item boxes (when the total number is 8, the number of gold boxes IM72 is 3 or less). In this case, too, the expected value (e.g. 1.5) of the average number of appearing gold boxes IM72 may be a fixed parameter or a variable parameter, with lottery being performed so as to achieve the expected value.

The computing unit 101 in the server device 100 assigns a predetermined reward item selected from the corresponding one of the different reward item groups, to each of the lucky boxes IM71 and the gold boxes IM72 of the numbers determined as described above (i.e. associates the reward item with the item box). In this case, it is preferable that the reward item group for the lucky boxes IM71 and the reward item group for the gold boxes IM72 are preset as a reward item table, and the appearance probability (weight) for each individual reward item included in the table is set as a fixed parameter or a variable parameter.

In addition, a trap is placed in each of the lucky boxes IM71 and the gold boxes IM72, and the item box is unlocked (opened) by clearing the trap. In this embodiment, there are two trap clearing methods. In the first method, the player or the player character clears the trap on his or her own, and the trap is cleared based on the unlock probability associated with each item box. In the second method, the player or the player character uses a specific tool (trap clear tool) for clearing the trap. The computing unit 101 in the server device 100 displays a screen for enabling the player to select the first method or the second method, on the terminal device 2. Having checked the total number and/or the allocation ratio of lucky boxes IM71 and gold boxes IM72 displayed in the game screen G7, the player can select whether or not to use the trap clear tool.

In more detail, in the case where the first method in which the player or the player character clears the trap on his or her own is selected, only the trap placed in at least a part of any of the lucky boxes IM71 and the gold boxes IM72 is cleared, and only the item box is unlocked. Here, each gold box IM72 relatively high in rarity value may have a lower unlock probability than each lucky box IM71 relatively low in rarity value (e.g. while the unlock probability of the lucky box IM71 is 30%, the unlock probability of the gold box IM72 is 5%). At this time, a game screen G81 showing an image IM81 of the unlocked state of only the item box whose trap has been cleared from among the item boxes displayed in the previous game screen G7 is displayed on the terminal device 2 (step S8).

Though the above describes the case where a part of the item boxes is unlocked, the present invention is not limited to this. Whether or not to unlock each item box is determined based on the unlock probability set in the item box. Accordingly, in the case where the first method is selected and all traps placed in the item boxes are cleared, a game screen G82 showing an image IM82 of the unlocked state of all item boxes displayed in the previous game screen G7 is displayed.

In the case where the second method in which the player or the player character uses the trap clear tool is selected, the player further selects whether an already possessed trap clear tool is used or, if the player possesses no trap clear tool, a new trap clear tool is acquired and used. In the case of employing the second method, the traps placed in all of the lucky boxes IM71 and the gold boxes IM72 displayed in the game screen G7 are cleared, and all of the item boxes are unlocked. At this time, the game screen G82 showing the image IM82 of the unlocked state of all item boxes displayed in the previous game screen G7 is displayed on the terminal device 2 (step S8).

Thus, the player or the player character can acquire the reward item assigned to and contained in each unlocked lucky box IM71 or gold box IM72, as a quest clear reward. A newly acquired reward item list IM9 is displayed alone or together with a list of already acquired and possessed reward items and other items, on the terminal device 2 as a game screen G9 (step S9).

With the server device 100, the control method for the server device 100, the game program, and the game system 1 having the structures described above, in the event where the player or the player character wins the battle between the player or the player character and the enemy character as the operation by the player in the game, i.e. when the player or the player character satisfies the predetermined determination condition, the lucky boxes IM71 and the gold boxes IM72 as a plurality of item boxes of a plurality of types associated with reward items are displayed on the terminal device 2 at one time. This delivers splendid performance filled with unpredictability and encouraging the player's sense of anticipation, as compared with the conventional single and uniform presentation technique for reward items and the like.

The reward items contained in (assigned to) the displayed lucky boxes IM71 and gold boxes IM72 are not simply provided to the player without any elaborate performance. The player is prompted to input whether or not the player uses or possesses the specific tool such as the trap clear tool as the operation by the player on the item boxes. Depending on the input, the reward item(s) assigned to a part or all of the displayed lucky boxes IM71 and gold boxes IM72 is provided to the player. Accordingly, a reward item acquisition (earning) scene richer in variety can thus be created.

It is therefore possible to add or enhance unprecedented unpredictability, performance, and amusement in a game scene or a game progress status when a reward item is provided to the player, thus encouraging the player's willingness to participate in or continue the game and enhancing or increasing the fun and thrill of the game as a whole.

Moreover, the numbers of appearing lucky boxes IM71 and gold boxes IM72, the reward items assigned to the lucky boxes IM71 and the gold boxes IM72, the unlock probabilities of the lucky boxes IM71 and the gold boxes IM72 when the specific trap clear tool is not used, and the like are determined by lottery with appropriate probabilities. Development that is not easily predictable by the player can be realized in this way. As a result, the fun and thrill of the game as a whole can be further enhanced or increased with greater amusement.

Furthermore, the use of the trap clear tool enables all of the lucky boxes IM71 and the gold boxes IM72 displayed as a result of quest clear to be unlocked (i.e. such a mode is available). The player can enjoy not only a sense of accomplishment of clearing the quest but also a sense of fulfillment as the player can acquire a maximum reward worth the effort. Hence, the player's willingness to continue the game can be further encouraged.

The present invention is not limited to the foregoing embodiment and modifications, and various other modifications are possible without departing from the scope of the present invention, as noted above. For example, the structure of the server device 100 shown in FIG. 1 is also applicable to each of the client computer 21 and the mobile terminal 22 as the terminal device 2, though they differ in throughput and the like. Conversely, the client computer 21 or the mobile terminal 22 may be used as the server device 100. That is, any computer device connected via the network 200 can function as the server device.

In the server device 100, a mass-storage device such as a hard disk or an SSD may be used to serve the same functions as the ROM 102, the RAM 103, the external memory 106, the memory device loaded in the slot drive 108, and the like. The storage device may or may not be subjected to redundancy by RAID or the like. Moreover, the storage device may not necessarily be connected to the computing unit 101 via the transmission path 120, and may be connected to, for example, another external device via the network 200 in cloud computing.

The network interface in each of the server device 100 and the terminal device 2 may be any of a wireless LAN device and a wired LAN device, which may be included inside or be an external device such as a LAN card. The terminal device 2 may be a game machine connectable to the network 200. Alternatively, the terminal device 2 may be an online karaoke machine.

As described above, the server device, the control method for the server device, the program, and the game system according to the present invention can enhance the unpredictability, performance, and amusement of the game, thus enhancing or increasing the fun and thrill of the game as a whole. The present invention can be widely and effectively used for all games distributed, provided, and implemented especially in server-client network structures, all software- and hardware-related techniques for distribution, provision, and implementation of the games, and activities such as design, manufacture, and sales thereof.

REFERENCE SIGNS LIST

1: game system
2: terminal device
21: client computer (terminal device)
22: mobile terminal (terminal device)
100: server device
101: computing unit (control unit)
102: ROM (information storage unit)
103: RAM (information storage unit)
104: external interface
105: input unit
106: external memory
107: image processing unit
108: slot drive
109: audio processing unit
110: network interface
111: display monitor
112: speaker device
120: transmission path
200: network (communication line)
G6, G7, G81, G82, G9: game screen
IM6: quest clear notification
IM71: lucky box (first item box)
IM72: gold box (second item box)
IM81: image of unlocked state of part of item boxes
IM82: image of unlocked state of all item boxes
IM9: reward item list
S1 to S9: step

What is claimed is:

1. A server device that is connected, via a communication line, to a terminal device operated by a player, and provides a game including a predetermined event, the server device comprising:
   an input unit that receives a first input of the player from the terminal device via the communication line;
   an information storage unit that stores a determination condition associated with the predetermined event, a plurality of reward items of a plurality of types, and a plurality of item boxes of a plurality of types, and
   a control unit that
      assigns at least one of the reward items to each of the item boxes,
      determines, based on the input of the player, whether or not an operation by the player in the game satisfies the determination condition,
      if the operation is determined to satisfy the determination condition,
         transmits, to the terminal device, image information for displaying the plurality of item boxes of the plurality of types simultaneously,
         transmits, to the terminal device, image information for displaying a screen for providing the player with a reward item assigned to a part or all of the item boxes,
         transmits, to the terminal device, image information for displaying a screen for enabling the player to select whether or not the player uses or possesses a specific tool necessary for acquiring reward items assigned to all of the item boxes;
   wherein the input unit receives, from the terminal device via the communication line, a second input of the player, the second input indicating whether or not the player uses or possesses the specific tool.

2. The server device according to claim 1, wherein the control unit determines whether or not the player uses or possesses the specific tool and, in the case where the player uses or possesses the specific tool, provides the reward items assigned to all of the item boxes to the player.

3. The server device according to claim 1, wherein the control unit determines whether or not the player uses or possesses the specific tool and, in the case where the player does not use or possess the specific tool, provides a reward item assigned to a part of the item boxes to the player.

4. The server device according to claim 1, wherein before or when providing the reward item to the player, the control unit determines the types and the number of item boxes displayed on the terminal device at one time, randomly or based on a predetermined condition.

5. The server device according to claim 1, wherein before or when providing the reward item to the player, the control unit determines the reward item assigned to each of the item boxes, randomly or based on a predetermined condition.

6. The server device according to claim 3, wherein before or when providing the reward item to the player, the control unit determines a probability of providing the reward item assigned to the part of the item boxes to the player, randomly or based on a predetermined condition.

7. The server device according to claim 4, wherein the predetermined condition is at least one of:
   a progress status of the game by the player; a state of a game character corresponding to the player; a type of the predetermined event; and
   an item box type.

8. The server device according to claim 1,
   wherein the item boxes include a first item box and a second item box that differ in a form of being displayed on the terminal device,
   wherein rarity is set for each of the reward items,
   wherein a reward item assigned to the second item box is higher in rarity than a reward item assigned to the first item box, and
   wherein the number of second item boxes displayed on the terminal device is smaller than the number of first item boxes displayed on the terminal device simultaneously with the second item boxes.

9. A method for controlling a server device that is connected, via a communication line, to a terminal device operated by a player and provides a game including a predetermined event, the server device including: an input unit, an information storage unit, and a control unit, the control method comprising:
   receiving, via the input unit, a first input of the player from the terminal device via the communication line;
   causing the information storage unit to store a determination condition associated with the predetermined event, a plurality of reward items of a plurality of types, and a plurality of item boxes of a plurality of types; and
   causing the control unit to
      assign at least one of the reward items to each of the item boxes,
      determine, based on the input of the player, whether or not an operation by the player in the game satisfies the determination condition,
      if the operating is determined to satisfy the determination condition,
         transmit, to the terminal device, image information for displaying the plurality of item boxes of the plurality of types simultaneously,
         transmit, to the terminal device, image information a screen for providing the player with a reward item assigned to a part or all of the item boxes, and
         transmit, to the terminal device, image information for displaying a screen for enabling the player to select whether or not the player uses or possesses a specific tool necessary for acquiring reward items assigned to all of the item boxes;
   wherein the input unit receives, from the terminal device via the communication line, a second input of the player, the second input indicating whether or not the player uses or possesses the specific tool.

10. A computer-readable recording medium having recorded therein a process for causing a computer to execute actions comprising:
   connecting, via a communication line, to a terminal device operated by a player, and providing a game including a predetermined event;
   receiving, from an input unit, a first input of the player from the terminal device via the communication line;
   storing a determination condition associated with the predetermined event, a plurality of reward items of a plurality of types, and a plurality of item boxes of a plurality of types;
   assigning at least one of the reward items to each of the item boxes;
   determining, based on the input of the player, whether or not an operation by the player in the game satisfies the determination condition;
   if the operation is determined to satisfy the determination condition, transmitting, to the terminal device, image information for displaying the plurality of item boxes of the plurality of types simultaneously, transmitting, to the terminal device, image information for displaying a screen for providing the player with a reward item assigned to a part or all of the item boxes, and transmitting, to the terminal device, image information for displaying a screen for enabling the player to select whether or not the player uses or possesses a specific tool necessary for acquiring reward items assigned to all of the item boxes;

at the input unit, receiving, from the terminal device via the communication line, a second input of the player, the second input indicating whether or not the player uses or possesses the specific tool.

11. A game system comprising:

a terminal device operated by a player;

a server device that is connected, via a communication line, to the terminal device and provides a game including a predetermined event;

an input unit that receives a first input of the player from the terminal device via the communication line;

an information storage unit that stores a determination condition associated with the predetermined event, a plurality of reward items of a plurality of types, and a plurality of item boxes of a plurality of types; and a control unit that assigns at least one of the reward items to each of the item boxes, determines, based on the input of the player, whether or not an operation by the player in the game satisfies the determination condition, if the operation is determined to satisfy the determination condition, transmits, to the terminal device, image information for displaying the plurality of item boxes of the plurality of types simultaneously, and, transmits, to the terminal device, image information for displaying a screen for providing the player with a reward item assigned to a part or all of the item boxes, on the terminal device, wherein the item boxes include a first item box and a second item box that differ in a form of being displayed on the terminal device, wherein rarity is set for each of the reward items, wherein a reward item assigned to the second item box is higher in rarity than a reward item assigned to the first item box, and wherein the number of second item boxes displayed on the terminal device is smaller than the number of first item boxes displayed on the terminal device simultaneously with the second item boxes.

12. A method for providing a reward item used in a game that is provided, via a communication line, to a terminal device operated by a player and includes a predetermined event, the method comprising:

receiving, via an input unit, a first input of the player from the terminal device via the communication line;

causing an information storage unit to store a determination condition associated with the predetermined event, a plurality of reward items of a plurality of types, and a plurality of item boxes of a plurality of types;

assigning at least one of the reward items to each of the item boxes;

determining, based on the input of the player, whether or not an operation by the player in the game satisfies the determination condition;

if the operating is determined to satisfy the determination condition, transmitting, to the terminal device, image information for displaying the plurality of item boxes of the plurality of types simultaneously, and transmitting, to the terminal device, image information a screen for providing the player with a reward item assigned to a part or all of the item boxes;

wherein the item boxes include a first item box and a second item box that differ in a form of being displayed on the terminal device, wherein rarity is set for each of the reward items, wherein a reward item assigned to the second item box is higher in rarity than a reward item assigned to the first item box, and wherein the number of second item boxes displayed on the terminal device is smaller than the number of first item boxes displayed on the terminal device simultaneously with the second item boxes.

* * * * *